United States Patent

Ukawa et al.

[11] Patent Number: 6,051,055
[45] Date of Patent: Apr. 18, 2000

[54] EXHAUST GAS DESULFURIZATION SYSTEM

[75] Inventors: Naohiko Ukawa; Toru Takashina; Susumu Okino, all of Hiroshima; Kazuaki Kimura; Koichiro Iwashita, both of Tokyo; Kouji Ikeda; Heiji Tanaka, both of Hiroshima, all of Japan

[73] Assignee: Mitsubishi Heavy Industries, Ltd., Tokyo, Japan

[21] Appl. No.: 09/117,566

[22] PCT Filed: Jan. 24, 1997

[86] PCT No.: PCT/JP97/00152

§ 371 Date: Jul. 28, 1998

§ 102(e) Date: Jul. 28, 1998

[87] PCT Pub. No.: WO97/27931

PCT Pub. Date: Aug. 7, 1997

[30] Foreign Application Priority Data

Feb. 1, 1996 [JP] Japan ................................. 8-016662

[51] Int. Cl.[7] .................................................. B01D 47/06
[52] U.S. Cl. .................. 96/322; 95/224; 95/235; 261/115; 261/116; 261/117
[58] Field of Search ................... 55/421; 95/224, 95/235, 189, 195, 199, 205; 96/234, 235, 270, 271, 273, 277, 280, 322, 328; 261/115, 116, 117, 118

[56] References Cited

U.S. PATENT DOCUMENTS

| | | |
|---|---|---|
| 2,014,044 | 9/1935 | Haswell ................................. 95/195 |
| 3,225,522 | 12/1965 | Black ................................... 96/277 |
| 3,928,005 | 12/1975 | Laslo ................................... 95/195 |
| 4,263,021 | 4/1981 | Downs et al. ......................... 95/224 |
| 4,305,909 | 12/1981 | Willett et al. ........................ 95/195 |
| 5,053,061 | 10/1991 | Tatani et al. ......................... 95/224 |
| 5,173,093 | 12/1992 | Johnson et al. ...................... 95/224 |
| 5,246,471 | 9/1993 | Bhat et al. ............................ 95/36 |
| 5,271,873 | 12/1993 | Nelson et al. ........................ 261/116 |
| 5,512,085 | 4/1996 | Schwab ................................ 261/116 |
| 5,605,655 | 2/1997 | Ishihara et al. ...................... 261/115 |
| 5,616,290 | 4/1997 | Ishihara et al. ...................... 261/115 |
| 5,785,901 | 7/1998 | Hasegawa et al. ................... 95/224 |

FOREIGN PATENT DOCUMENTS

| | | |
|---|---|---|
| 0 253 605 A2 | 1/1988 | European Pat. Off. . |
| 0 496 295 A1 | 7/1992 | European Pat. Off. . |
| 0 524 729 A1 | 1/1993 | European Pat. Off. . |
| 0 676 230 A2 | 10/1995 | European Pat. Off. . |
| 54099080 | 8/1979 | Japan . |
| 59-53828 | 4/1984 | Japan . |
| 62061617 | 3/1987 | Japan . |

*Primary Examiner*—Duane S. Smith
*Attorney, Agent, or Firm*—Myers Bigel Sibley & Sajovec

[57] ABSTRACT

An exhaust gas desulfurization system includes a spray pipe which is provided with a plurality of nozzles in the lengthwise direction and whose one end is closed and arranged horizontally in an absorption tower through which the exhaust gas passes vertically. Absorbent slurry is fed from the other end of the spray pipe and is injected upward from the nozzles, by which absorbent slurry is brought into contact with the exhaust gas to perform treatment in the absorption tower. The flow passage on the closed end side of the pipe is present in a shape such that the flow passage cross-sectional area decreases toward the closed end.

2 Claims, 8 Drawing Sheets

TRANSFER OF HEAPS OF SCALES

TRANSFER OF DISPERSED HEAPS OF SCALES

EXHAUST GAS DESULFURIZATION SYSTEM

TECHNICAL FIELD

The present invention relates to an exhaust gas desulfurization system in which slurry is efficiently brought into contact with exhaust gas.

BACKGROUND ART

Some conventional exhaust gas desulfurization systems provided for exhaust gas treatment in a thermal electric power plant etc. use what is called a liquid column type gas-liquid contact apparatus in which absorbent slurry is brought into contact with exhaust gas to absorb sulfur oxides in exhaust gas as disclosed in Unexamined Japanese Utility Model Publication No. 59-53828.

In the gas-liquid contact apparatus used for the desulfurization system of this type, a spray pipe, which is provided with a plurality of nozzles in the lengthwise direction and whose one end is closed, is arranged horizontally in a contact treatment tower (absorption tower) through which gas passes vertically so that a liquid is supplied from the other end of this spray pipe and injected upward, by which the liquid is brought into contact with the gas to perform treatment.

Usually, a plurality of the aforementioned spray pipes are arranged in parallel over the transverse range in the contact treatment tower, and a supply pipe, to which the other ends of these spray pipes are connected at plural places in the lengthwise direction, whose one end is closed, and from the other end of which the liquid is supplied, is provided outside the contact treatment tower. Thereby, the liquid is supplied to each spray pipe via this supply pipe.

The aforementioned spray pipes and supply pipe are conventionally formed of a pipe having a constant cross section in the lengthwise direction, so that the flow passage cross section is constant in the lengthwise direction.

In the conventional gas-liquid contact apparatus of this type, as shown in FIG. 7, the blow-up state of liquid from several nozzles on the closed end side, of the nozzles provided on the spray pipe, is disturbed greatly, so that the blow-up heights thereof vary and decrease remarkably on an average as compared with the blow-up heights of liquid from other nozzles. If the blow-up state is bad as described above and the scattering of liquid is insufficient at some places, some of exhaust gas passing through the contact treatment tower scarcely comes in contact with the liquid (absorbent slurry) in the tower, so that the desulfurization percentage decreases extremely in the case of the desulfurization system.

There is a method in which in order to maintain a high desulfurization percentage forcedly, the entire supply quantity of liquid is considerably increased to make the scattering state in this place sufficient. However, with this method, the quantity of liquid supplied to the remaining nozzles increases wastefully, resulting in the increase in operation cost.

Also, in the conventional gas-liquid contact apparatus, in addition to the above-described nonuniform blow-up state of one spray pipe, nonuniformity of blow-up heights occurs between individual spray pipes. Specifically, in the lengthwise direction of the supply pipe as well, the blow-up state of spray pipes closer to the closed one end of the supply pipe is unstable, and the blow-up heights thereof reversely become great as compared with the other spray pipes.

Assuming that Bernoulli's theorem holds macroscopically for the average value of flow velocity etc., the blow-up height is thought to be approximately proportional to the static pressure. Therefore, it is thought that as the position comes closer to the closed one end of the spray pipe or supply pipe, the flow rate (dynamic pressure) decreases and the static pressure increases, by which the blow-up height is increased.

However, in the lengthwise direction of spray pipe, contrary to this theorem, actually the blow-up heights at the downstream-side nozzles are low on an average as described above, being nonuniform.

Also, the position of the inner face of end plate for closing one end of spray pipe is conventionally set at the outside position far distant from the position of the maximum inlet inside diameter of nozzle positioned closest to the closed end of spray pipe as indicated by reference numeral 61a in FIG. 10.

DISCLOSURE OF THE INVENTION

An object of the present invention is to provide an exhaust gas desulfurization system using a gas-liquid contact apparatus in which the blow-up state from the spray pipe is uniform and stable, a high gas-liquid contact efficiency (desulfurization percentage) is maintained, and the operation cost can be reduced.

To achieve the above object, the present invention provides the systems described in the items (1) to (5) described below.

(1) An exhaust gas desulfurization system for absorbing sulfur oxides in exhaust gas by bringing absorbent slurry into contact with the exhaust gas, characterized in that a spray pipe which is provided with a plurality of nozzles in the lengthwise direction and whose one end is closed is arranged horizontally in an absorption tower through which the exhaust gas passes vertically, the absorbent slurry is fed from the other end of the spray pipe and injected upward from the nozzles, by which the absorbent slurry is brought into contact with the exhaust gas to perform treatment, and a flow passage on the closed one end side of the spray pipe is formed in a shape such that the flow passage cross-sectional area decreases toward the closed one end.

(2) An exhaust gas desulfurization system defined in the above item (1), wherein the spray pipe is formed of a pipe with a constant cross section, and a tilting plate which tilts to the nozzle side toward the closed one end of the pipe is installed inside the pipe on the closed one end side, so that the flow passage cross-sectional area decreases toward the closed one end.

(3) An exhaust gas desulfurization system defined in the above item (1) or (2), wherein the inner face position of an end plate for closing on end of the spray pipe is set at a nearby position 0.05 D (D is the inside diameter of the spray pipe) distant from the position of the maximum inlet inside diameter of nozzle positioned closest to the closed one end of the spray pipe toward the closed one end side, or at a position on the inside of the nearby position.

(4) An exhaust gas desulfurization system defined in any one of the above items (1) to (3), wherein a plurality of the spray pipes are arranged in parallel transversely, a supply pipe, to which the other ends of these spray pipes are connected at plural places in the lengthwise direction, whose one end is closed, and from the other end of which the absorbent liquid is supplied, is provided so that the absorbent slurry is supplied to individual spray pipes via the supply pipe, and the supply pipe is formed into a shape such that the flow passage cross-sectional area decreases toward the closed one end.

(5) An exhaust gas desulfurization system for absorbing sulfur oxides in exhaust gas by bringing absorbent slurry into contact with the exhaust gas, in which a plurality of spray pipes each of which are provided with a plurality of nozzles arranged in the lengthwise direction and whose one end is closed are arranged horizontally at the lower part of a contact treatment tower as a means for bringing the absorbent slurry (liquid) into contact with the exhaust gas (gas), so that the absorbent slurry containing slurry heaps is fed from the other end of the spray pipe and brought into contact with the exhaust gas by injecting the absorbent slurry and slurry heaps upward from the nozzles to perform absorption treatment, the exhaust gas desulfurization system being characterized in that the spray pipe is formed of a pipe with a constant cross section, a tilting plate which tilts to the nozzle side toward the closed one end of the pipe is installed inside the pipe on the closed one end side, the tilting plate is connected to an end plate for closing one end of the spray pipe in a proper positional relation, the inner face position of the end plate is set at a position between a position of the maximum inlet inside diameter of nozzle positioned on the most downstream side of the spray pipe and a position 0.05 D distant from the aforesaid position to the downstream side, and the tilting plate is arranged from a middle position between the third and fourth nozzles from the most downstream nozzle or from a middle position between the fourth and fifth nozzles and tilted so that the area above the tilting plate at the position of the most downstream nozzle is 0.2 to 0.3 times the cross-sectional area of spray pipe.

According to the present invention, the flow passage on the closed one end side of spray pipe is formed into a shape such that the flow passage cross-sectional area decreases toward the closed end. Therefore, the flow of liquid flowing into the nozzles on the closed end side of spray pipe is stabilized, so that a phenomenon that the blow-up state of the nozzles is disturbed and the blow-up heights are lower than those of the nozzles on the other end side is improved remarkably as compared with the conventional apparatus, and the gas-liquid contact efficiency is enhanced.

Also, if the spray pipe is formed of a pipe with a constant cross section, and a tilting plate which tilts to the nozzle side toward the closed end of the pipe is installed inside the pipe on the closed end side, so that the flow passage cross-sectional area decreases toward the closed end, the spray pipe can be manufactured easily by merely installing the tilting plate in a conventional pipe which has so far been used, and the modification of the existing facility is made easy.

Also, if the inner face position of the end plate for closing one end of spray pipe is set at a nearby position of the maximum inlet inside diameter of nozzle positioned closest to the closed end of spray pipe or on the inside of the nearby position of the maximum inlet inside diameter, the blow-up state of the nozzle positioned closest to the closed end of spray pipe especially become proper and stable, and a further increase in gas-liquid contact efficiency can be achieved.

Also, if a supply pipe, to which the other ends of the spray pipes arranged in parallel transversely are connected at plural places in the lengthwise direction, whose one end is closed, and from the other end of which the absorbent liquid is supplied, is provided so that the absorbent slurry is supplied to individual spray pipes via the supply pipe, when the supply pipe is formed into a shape such that the flow passage cross-sectional area decreases toward the closed one end, the flow velocity can be made uniform and the flow can be stabilized in the supply pipe. Therefore, the blow-up heights from the spray pipes are made uniform and the disturbance etc. of the blow-up state from the spray pipe connected to the closed end side of supply pipe are eliminated, so that the uniformity and stabilization of the blow-up state of all the nozzles arranged two-dimensionally as a whole are achieved, which contributes to a further increase in gas-liquid contact efficiency.

Also, according to the desulfurization system of the present invention, unlike the conventional downward spray type, since the liquid is once blown up and drops, the residence time of liquid in the tower is long, the blown-up liquid collides with the dropping liquid in the middle of the tower, and a concentrated liquid layer is formed, so that a high gas-liquid contact efficiency can be obtained. As a result, the quantity of circulating slurry can be decreased, resulting in a reduction in running cost. That is, since the gas-liquid contact apparatus, in which the uniformity and stabilization of the blow-up state can be achieved as described above, and gas-liquid contact can be effected efficiently with less supply quantity of absorbent slurry, is used, a high desulfurization percentage can be achieved while the supply quantity of absorbent slurry is decreased.

BEST MODE OF CARRYING OUT THE INVENTION

One example of an embodiment of the present invention will be described below with reference to FIGS. 1 to 5.

Figure 1:
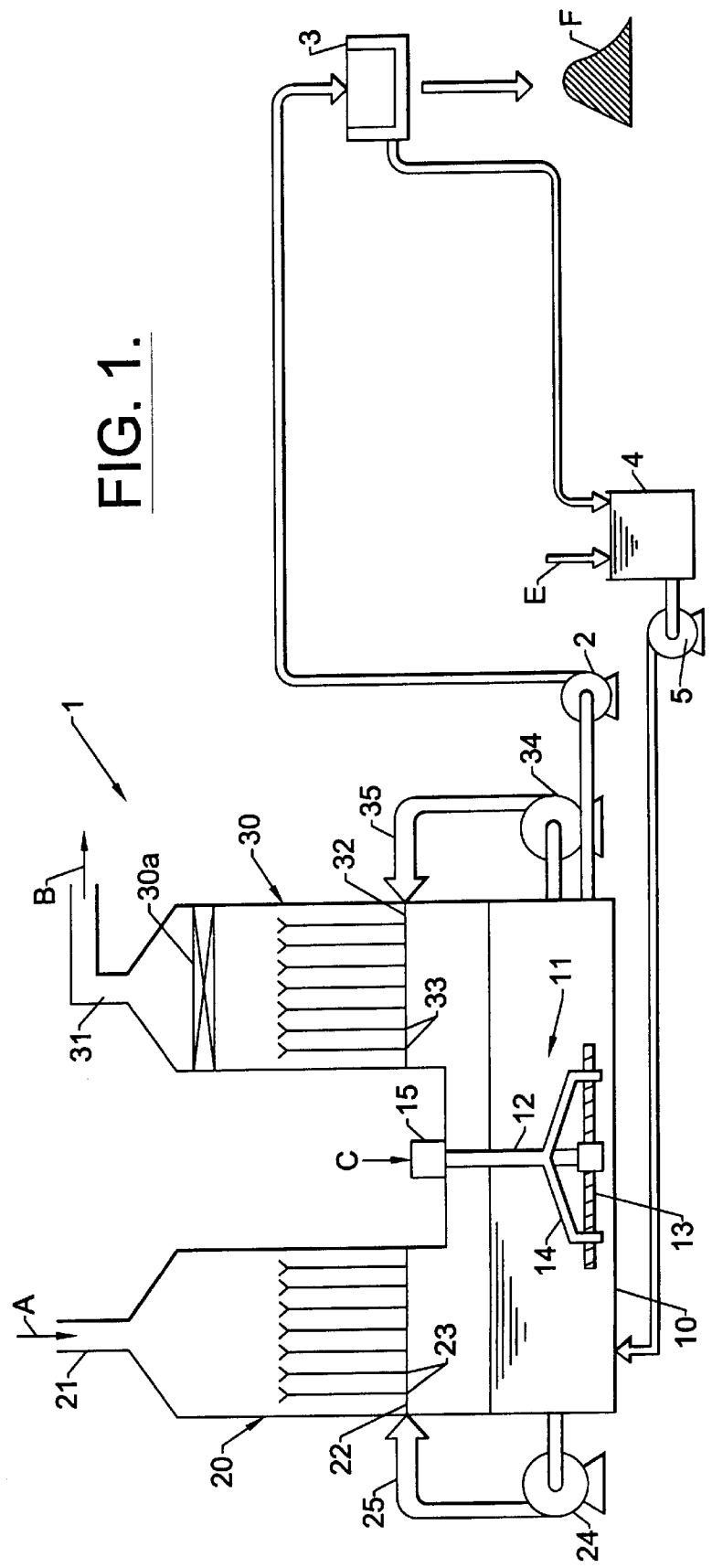
FIG. 1 is an overall configuration view of an exhaust gas desulfurization system, which is one example of embodiment of the present invention.
Figure 2:
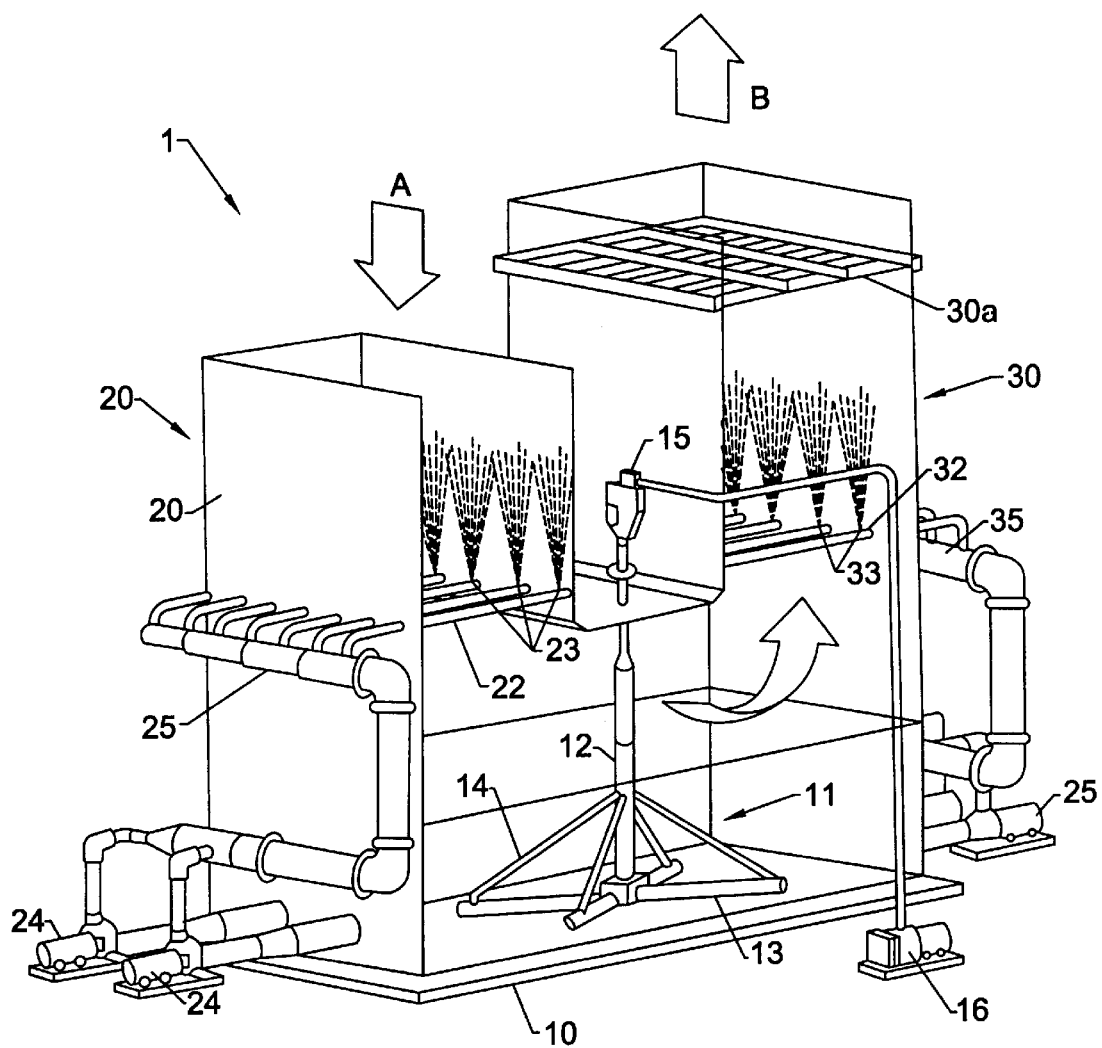
FIG. 2 is a perspective view of the principal portion of the system shown in FIG. 1.

An exhaust gas desulfurization system of this example has, as shown in FIG. 1, a gas-liquid contact apparatus 1 as shown in FIG. 2 as a gas-liquid contact apparatus for bringing absorbent slurry (liquid) into contact with exhaust gas (gas) and further with air for oxidation.

This gas-liquid contact apparatus 1 includes a tank 10 for supplying absorbent slurry (calcium-containing slurry, in this case, limestone slurry), an inlet-side absorption tower (contact treatment tower) 20 which extends upward from one side portion (left side in the figure) of the tank 10 and at the top end of which an exhaust gas introducing portion 21 is formed to introduce untreated exhaust gas A, and an outlet-side absorption tower (contact treatment tower) 30 which extends upward from the other side portion (right side in the figure) of the tank 10, at the top end of which an exhaust gas discharging portion 31 is formed to discharge treated exhaust gas B, and in which the exhaust gas passing through the inlet-side absorbent 20 and the upper part of the tank 10 flows upward.

Each of the absorption towers 20 and 30 is provided with spray pipes 22 and 32, respectively. Each of these spray pipes 22 and 32 is formed with a plurality of nozzles 23 and 33 which inject absorbent slurry upward in a liquid column form. At each side of the tank 10, a circulating pump 24, 34 for blowing up absorbent slurry in the tank 10 is provided so that the absorbent slurry is fed into the spray pipes 22, 32 via a supply pipe 25, 35 and injected through the nozzles 23, 33. Further, in this case, a mist eliminator 30a is provided at the upper part of the outlet-side absorption tower 30 to trap and remove entrained mist. The mist trapped by this mist eliminator 30a returns into the tank 10 directly, for example, by dropping in the outlet-side absorption tower 30.

The spray pipes 22, 32 are arranged in plural numbers in parallel to each other over the transverse range in the absorption tower as shown in FIG. 2, and the other end of each spray pipe is connected to each of a plurality of places in the lengthwise direction of the supply pipe 25, 35. As shown in FIG. 2, the supply pipe 25, 35 is of a tapered shape toward the closed one end in the range in which the spray pipes 22, 23 are connected so that the cross-sectional area of flow passage decreases. The rate of decrease in flow passage cross-sectional area of the supply pipe 25, 35 is set so that the average flow velocity inside the pipe is substantially constant in the lengthwise direction.

The detailed construction of the spray pipe 22, 32 and the nozzle 23, 33 will be described later with reference to FIG. 3.

In this example, an air supplying means 11 is provided in the tank 10. The absorbent slurry, which is blown up from the spray pipe 22, 23 and flows down while absorbing sulfur dioxide gas, is oxidized by the air blown from the air supplying means 11 in the tank 10, by which gypsum is obtained as a by-product.

The air supplying means 11, being of an arm rotating type in this case, has a stirring rods 13 which are supported by a hollow rotating shaft 12 in the tank 10 and horizontally rotated by a not illustrated motor, an air supply pipes 14 which extend from the hollow rotating shaft 12 and whose open end extends to the lower side of the stirring rod 13, and a rotary joint 15 for connecting the base end of the hollow rotating shaft 12 to an air source. By using the air supplying means 11, air C is supplied to a gas phase region produced on the back side of the stirring rod 13 in the rotating direction by the air supply pipes 14 by rotating the hollow rotating shaft 12 while air C is supplied under pressure from the rotary joint 15, by which a breaking phenomenon of the gas phase region edge portion is caused by the whirlpool force produced by the rotation of the stirring rod 13, so that many substantially uniform fine bubbles are generated. Thereby, the absorbent slurry solution having absorbed sulfur dioxide gas is efficiently brought into contact with the air in the tank 10.

The main reactions occurring in the treatment are expressed by the reaction formulae (1) to (3) described below.

(Absorption tower)

$$SO_2 + H_2O \rightarrow H^+ + HSO_3^- \qquad (1)$$

(Tank)

$$H^+ + HSO_3^- + \tfrac{1}{2}O_2 \rightarrow 2H^+ + SO_4^{2-} \qquad (2)$$

$$2H^+ + SO_4^{2-} + CaCO_3 + H_2O \rightarrow CaSO_4 \cdot 2H_2O + CO_2 \qquad (3)$$

The slurry (gypsum and a small amount of limestone, which is absorbent, are suspended or solved) in the tank 10 is sucked by a slurry pump 2 and supplied to a solid-liquid separator 3, being filtered and taken out as gypsum F containing less water (usually, water content of about 10%). On the other hand, the filtrate from the solid-liquid separator 3 is sent to a slurry tank 4, where limestone E is added together with make-up water, and again supplied into the tank 1 by a slurry pump 5.

Reference numeral 16 in FIG. 2 denotes an air blower for supplying air to the air supplying means 11 via the rotary joint 15.

Next, a typical construction of the spray pipe 22, 32 will be described with reference to FIGS. 3 to 5. In this case, the spray pipe 22, 32 is formed with a plurality of circular holes at constant intervals on the upper side of the pipe 41 having a circular cross section (constant cross section), and a cylindrical member 42 for installing nozzle is fixed around the top face of the circular hole by welding etc. A nozzle body 43 is fitted into the cylindrical member 42, and fastened by a flange 44 installed at the top end outer periphery of the cylindrical member 42, by which the nozzle 23, 33 is configured.

As the pipe 41, for example, a pipe with a pipe inside diameter of about 200 to 300 mm which is provided with nozzles at intervals of about 500 mm can be used. In this case, the energy loss caused by frictional resistance etc. can almost be neglected. Also, for example, about ten nozzles 23, 33 are arranged on one spray pipe.

On the inside of one end (right-side end in the FIG. 3) of the pipe 41, an end constituting member 50 composed of an end plate 51 and a tilting plate 52 is provided. In this case, the end constituting member 50, which has been manufactured integrally in advance by welding etc., is inserted from one end of the pipe 41, fixedly installed, for example, by welding the outer face outer periphery of the end plate 51 to the pipe 41. Thereby, the end plate 51 for closing one end of the pipe 41 and the tilting plate 52 are provided.

The tilting plate 52 forms the flow passage on the closed end side of the spray pipe 22, 32 into a shape such that the flow passage cross sectional area decreases toward the closed end. As shown in FIG. 3, the tip end of the tilting plate 52 is disposed at the substantially middle position between the third and fourth nozzles from the closed end side of the spray pipe 22, 32. The tip end is in close contact with the inner bottom surface of the pipe 41, and tilts to the nozzle side (upper side) toward the base end side (closed end side) connected to the end plate by welding etc. This tilting plate 52 partitions the interior of the pipe 41 by being formed into a shape such that both ends join to the inner surface of the pipe 41.

The length of the region in which the flow passage cross-sectional area decreases may be a length of the region where the blow-up heights are disturbed and lower than those of slurry from other nozzles, though it changes depending on the inside diameter of spray pipe, the intervals of nozzles, the injection pressure of slurry, etc.

Usually, since such a variation occurs at the second to third nozzles from the end of spray pipe, the tilting plate is preferably arranged from the middle position between the third and fourth nozzles or from the middle position between the fourth and fifth nozzles from the most downstream nozzle.

The tilt angle of the tilting plate 52 is preferably such that the flow passage cross-sectional area at the centerline position of the first nozzle from the closed end of spray pipe 22, 32 is approximately 20% of the inside cross-sectional area of the pipe 41 itself. That is, the flow passage cross-sectional area on the tilting plate at the position of the most downstream nozzle is 0.2 to 0.3 times the cross-sectional area of spray pipe.

Figure 3:
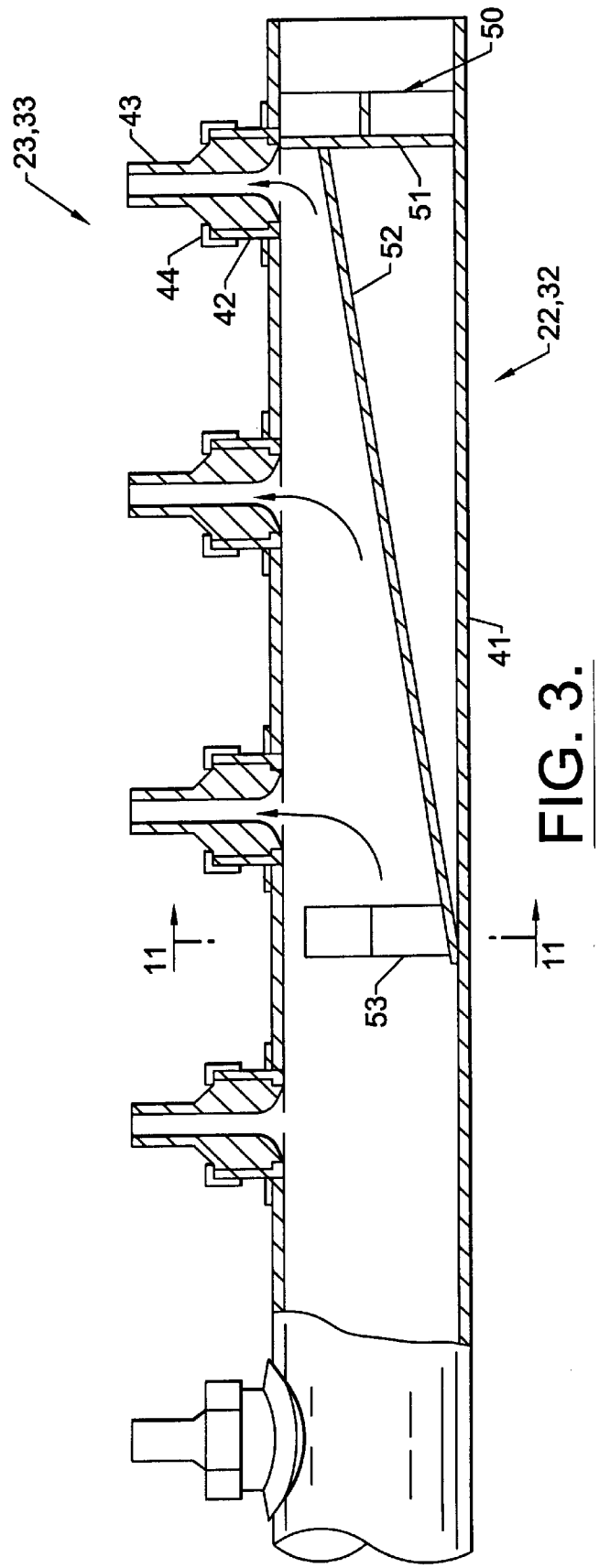
FIG. 3 is a side sectional view showing the construction of spray pipe for the system shown in FIGS. 1 and 2.
Figure 5:
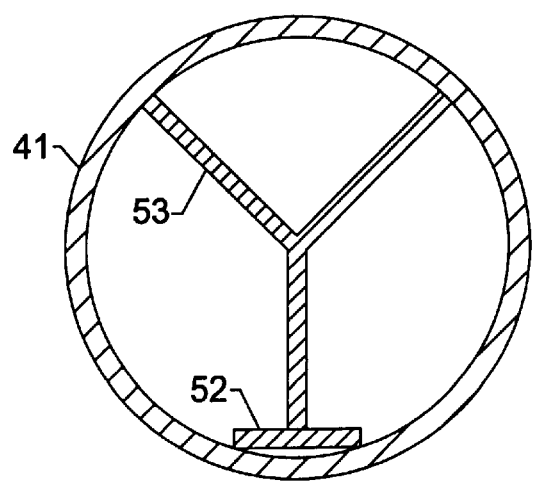
FIG. 5 is a sectional view taken along the line XI—XI of FIG. 3, showing the construction of spray pipe for the system shown in FIGS. 1 and 2.

As shown in FIGS. 3 and 5, on the upper surface of the tilting plate 52 at the tip end thereof, a holding member 53 of a Y shape in cross section is provided integrally in advance by welding etc., by which the tip end of the tilting plate 52 is held in a state such as to be in contact with the bottom surface of the pipe 41.

By inserting the end constituting member 50 and fixing it on the closed end side by welding etc., if the end constituting member 50 has a construction in which the end plate 51 and the tilting plate 52 are provided, the tilting plate can be installed easily and stably in the interior of pipe into which a tool (welding torch etc.) is inserted with difficulty.

The position of the inner face of the end plate 51 is set at a position $\alpha=0.05\, D$ (D is the inside diameter of the spray pipe) distant from the position of the maximum inlet inside diameter of nozzle positioned closest to the closed end of the spray pipe 22, 32 to the closed end side, or at a position of inside from the aforesaid position.

Figure 4:
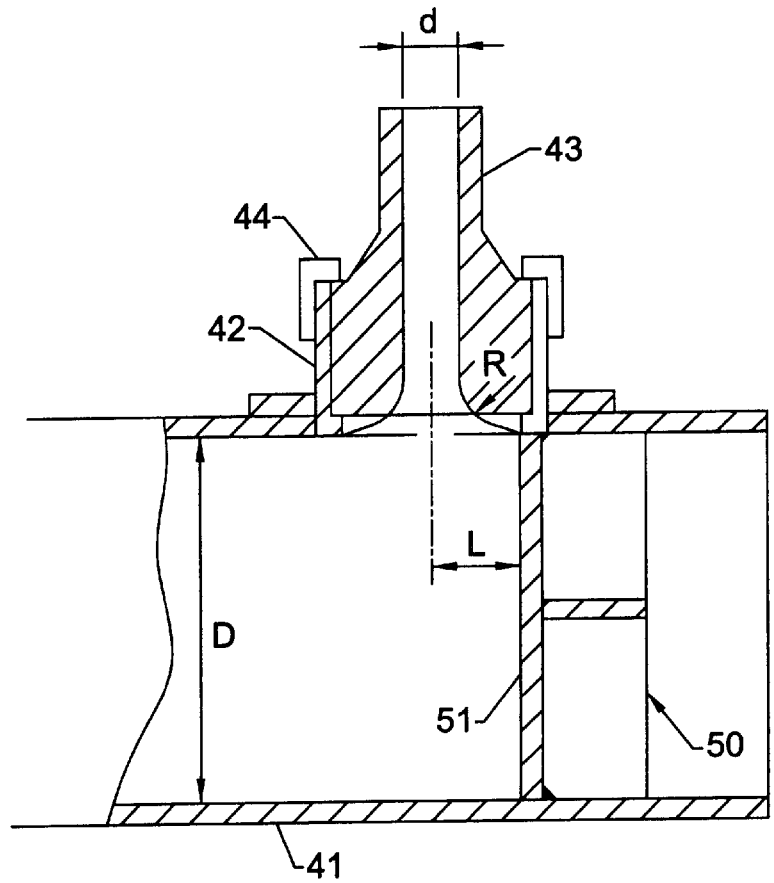
FIG. 4 is a partially sectional view showing the construction of spray pipe for the system shown in FIGS. 1 and 2.

As shown in FIG. 4, if the inside diameter of the spray pipe 22, 23 is taken as D, the diameter of nozzle body 43 as d, the curvature radius at the inlet of the nozzle body 43 as R, and the distance from the centerline of nozzle positioned closest to the one end to the inner face of the end plate 51 as L, the distance L is set so that the following equation (4) holds.

$$L \leq L_0 \quad (L_0 = d/2 + R + \alpha,\ \alpha = 0.05D) \tag{4}$$

For example, the value of $\alpha$ is 10 mm when D=200 mm, and 15 mm when D=300 mm.

Next, the operation of the gas-liquid contact apparatus configured as described above will be described.

The absorbent slurry in the tank 10 is supplied to the spray pipes 22, 32 through the supply pipe 25, 35 by means of the circulating pump 24, 34. On the other hand, the exhaust gas is first introduced into the inlet-side absorption tower 20 through the exhaust gas introducing portion 21, and flows down in the absorption tower 20. The absorbent slurry supplied to the spray pipes 22 is injected upward from the nozzles 23 of the spray pipes 22. The absorbent slurry blown up upward disperses and then goes down. The going-down slurry and the blown-up slurry collide with each other to produce fine particles. Fine particulate slurry is produced successively, so that particulate slurry exists in a state of being dispersed in the tower and then drops slowly. Since the exhaust gas containing sulfur dioxide gas flows down in the tower in which the particulate slurry exists, the gas-liquid contact area per volume increases. Also, the exhaust gas is entangled effectively in the blowing-up flow of slurry in the vicinity of the nozzle 23, so that the slurry and the exhaust gas are mixed effectively, by which a considerable amount of sulfur dioxide gas is first removed in this parallel flow type absorption tower 20.

Then, the exhaust gas flowing down in the absorption tower 20 flows horizontally at the upper part of the tank 10, and then enters the absorption tower 30 from the downside and rises in the absorption tower 30. In the absorption tower 30, absorbent slurry is injected upward from the nozzles 33 of the spray pipes 32. As in the absorption tower 20, the slurry and the exhaust gas are mixed effectively, by which the almost all remaining sulfur dioxide gas is finally removed in this counter flow type absorption tower 30.

In the tank 10, as described above, air C sent from the air blower 16 is blown into the slurry as fine bubbles by using the air supplying means 11. The absorbent slurry, which absorbs sulfur dioxide gas and flows down in the absorption towers 20 and 30, comes in contact with the air and is oxidized to yield gypsum.

Figure 6:
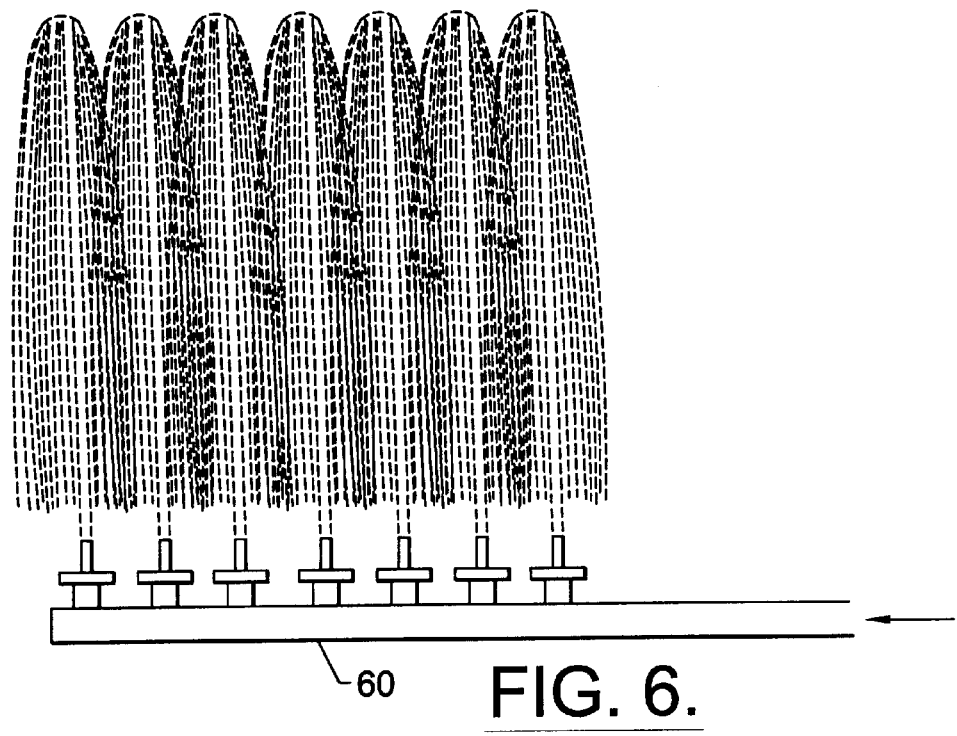
FIG. 6 is a view showing the result (blow-up state of each nozzle) of experiment using a spray pipe in accordance with the embodiment of the present invention.

At this time, according to the configuration of this example, the blow-up of slurry from the nozzles 23, 33 of the spray pipe 22, 32 is uniform and stable over the whole range as shown in FIG. 6. Therefore, the gas-liquid contact between the exhaust gas and the absorbent slurry is effected uniformly over the entire horizontal region in the absorption tower, so that efficient absorption treatment is carried out. Thereby, a high desulfurization percentage is maintained while the circulation quantity (supply quantity) of slurry supplied by the circulating pumps 24 and 25 is held at the necessary minimum.

Although this effect was confirmed mainly by an experiment made by the inventors as described below, the principle is thought to be as follows.

First, regarding the mutual relationship between the spray pipes (regarding the lengthwise direction of supply pipe), since the supply pipe 25, 35 has a tapered flow passage shape as described above, the average flow velocity in the interior thereof is constant, so that the static pressure of slurry flowing in the supply pipe is substantially constant in the lengthwise direction. Also, since the flow passage is narrowed down gradually on the closed pipe end side, the turbulence of flow is restricted. Therefore, a trouble such that the blow-up heights become nonuniform, or the blow-up state from the spray pipes on the closed end side of supply pipe becomes unstable (variations in blow-up height and direction) between the spray pipes (in the lengthwise direction of supply pipe) is decreased significantly as compared with the conventional apparatus.

Figure 10:
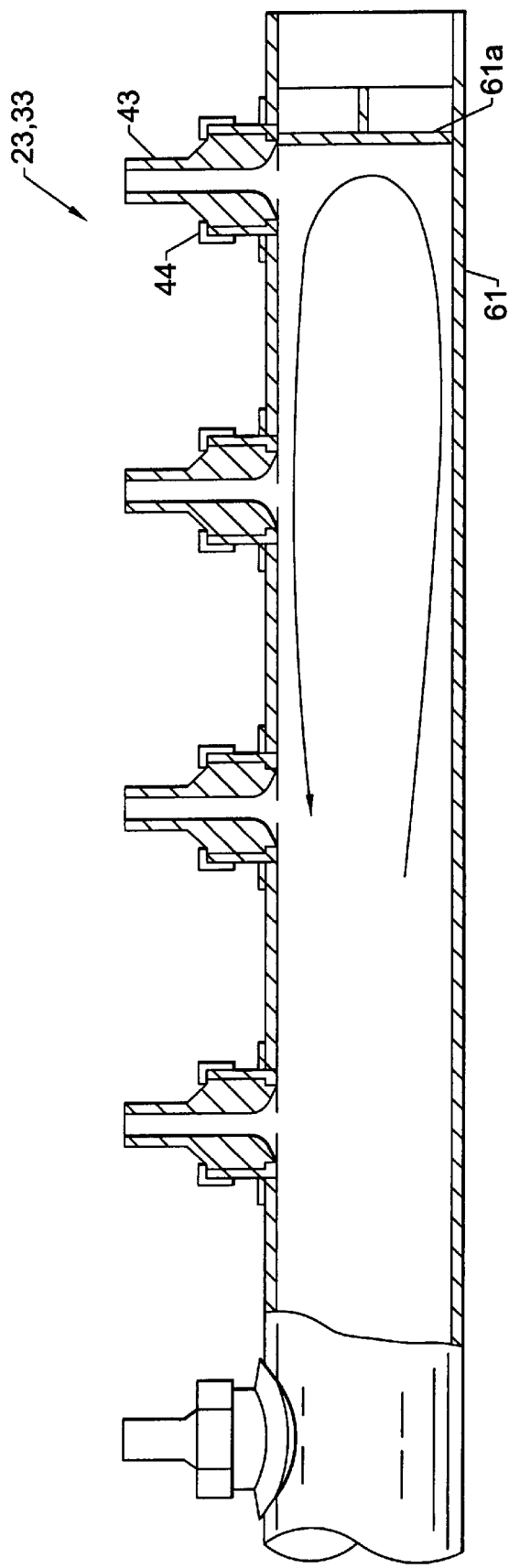
FIG. 10 is a side sectional view showing the construction of spray pipe which is a comparative example of the present invention.

For each spray pipe as well, since the flow passage is tapered by the tilting plate 52 and the end plate 51 is positioned on the inside from the maximum inside diameter of nozzle inlet, the later-described turbulence of flow (generation of whirlpool, variation) as shown in FIG. 10 is restricted, so that the flow on the closed end side in the pipe becomes well-regulated as indicated by arrows in FIG. 3. Therefore, a trouble such that the blow-up state of the nozzles in each spray pipe, particularly on the closed end side, becomes extremely unstable, or the average height decreases extremely as compared with other nozzles is eliminated.

Another important function of the tilting plate 52 is to transfer heaps of scales, which are mixed in the liquid supplied into the spray pipe from the oxidation tank via the pump, to the position under the most downstream nozzle along the tilting plate 52 by the liquid flow and to discharge them from the most downstream nozzle without accumulation in the spray pipe.

Also, the end plate 51 performs an important function to restrain the variation in height level of liquid column from the most downstream nozzle. That is, the end plate 51 prevents the development of whirlpool occurring at the closed end pocket portion of spray pipe.

The variation in height level of liquid column from the most downstream nozzle is not always prevented sufficiently by the installation of the tilting plate 52 only in some cases, and the arrangement of the end plate 51 can control the liquid column level.

As described above, the end plate 51 prevents the development of whirlpool occurring at the end pocket portion and restrain the variation in height level of liquid column from the most downstream nozzle. In addition, it also has a function of raising and discharging the heaps of scales transferred to the position under the most downstream nozzle by using the slightly remaining whirlpool.

Thus, by arranging the tilting plate 52 and the end plate 51 in a proper positional relation between them as well, stable blow-up of liquid column and stable continuous operation in which heaps of scales in the liquid supplied into the spray pipe is discharged from the spray pipe can be achieved.

As described above, according to the desulfurization system having the gas-liquid contact apparatus 1 of the above example, the blow-up state of slurry (liquid) from the nozzles can be made uniform and stable over the entire region in the tower. Accordingly, efficient gas-liquid contact can be achieved without a wasteful increase in slurry circulation flow rate due to a bad blow-up state in some portions, which contributes greatly to the improvement in desulfurization percentage and the decrease in operation cost.

Also, since the supply pipe 25, 35 and the spray pipes 22, 32 are configured so that the flow passage cross-sectional area decreases toward the downstream flow, the decrease in flow velocity toward the downstream flow is inhibited (especially, in the supply pipe, the flow velocity is substantially constant). Therefore, a phenomenon that the solid matters in slurry are settled and adhere to the bottom surface in the pipe, turning to scales, by the decrease in flow velocity can be prevented.

In the above example, gas-liquid contact (absorption of sulfur dioxide gas) can be performed at two stages because two absorption towers are provided for one tank. For this reason, even if the height of each contact treatment tower (absorption tower) and the circulating flow rate of slurry are equal to or less than those of the conventional apparatus, a gas-liquid contact efficiency (desulfurization percentage) equal to or higher than that of the conventional apparatus can be obtained. Moreover, since what we call the counter flow type gas-liquid contact, which has a higher contact efficiency than the parallel flow type, is performed in the outlet-side contact treatment tower (outlet-side absorption tower), the gas-liquid contact efficiency can further be increased as compared with the case where merely two parallel flow type gas-liquid contact apparatuses are connected in series.

The present invention is not limited to the above-described embodiment, and can be modified variously. For example, the spray pipe can be constructed so that the pipe body portion (for example, the aforementioned pipe 41) itself is of a tapered shape toward the closed end.

Also, there may be one absorption tower (contact treatment tower) for one tank. In this case, the blow-up height must be increased to achieve a predetermined desulfurization percentage by using one absorption tower. Therefore, the operation of the present invention becomes more remarkable, so that a greater effect can be achieved.

Also, the desulfurization system of the present invention is not limited to the tank oxidation system as described in the above embodiment, and it may be configured so as to separately provide, for example, an oxidation tower. Further, the gas-liquid contact apparatus of the present invention is not limited to a case where it is used as a facility for absorption process in the exhaust gas desulfurization system as described above, and can be used in a variety of fields, if the process requires efficient contact of liquid with gas.

The working examples and comparative examples (experiment results) for demonstrating the operation of the present invention regarding the construction of spray pipe will be described below with reference to FIGS. 6 to 10.

(a) Experiment 1

In Experiment 1, as a comparative example, as shown in FIG. 10, a spray pipe 61 (having seven nozzles), in which no tilting plate was provided and an end plate 61a was located at a position far distant to the outside from the inlet of nozzle closest to the closed end, was used, the overall blow-up heights (the blow-up heights for nozzles at the positions distant from the closed end at which the blow-up state was stable) were changed from 3 m to 9 m, and the blow-up state of each nozzle was checked by visual observation and photography etc.

In this example, D=204.6 mm (200A pipe is used), d=40 mm, and R=40 mm in FIG. 4, so that $L=L_0+40$.

Figure 7:
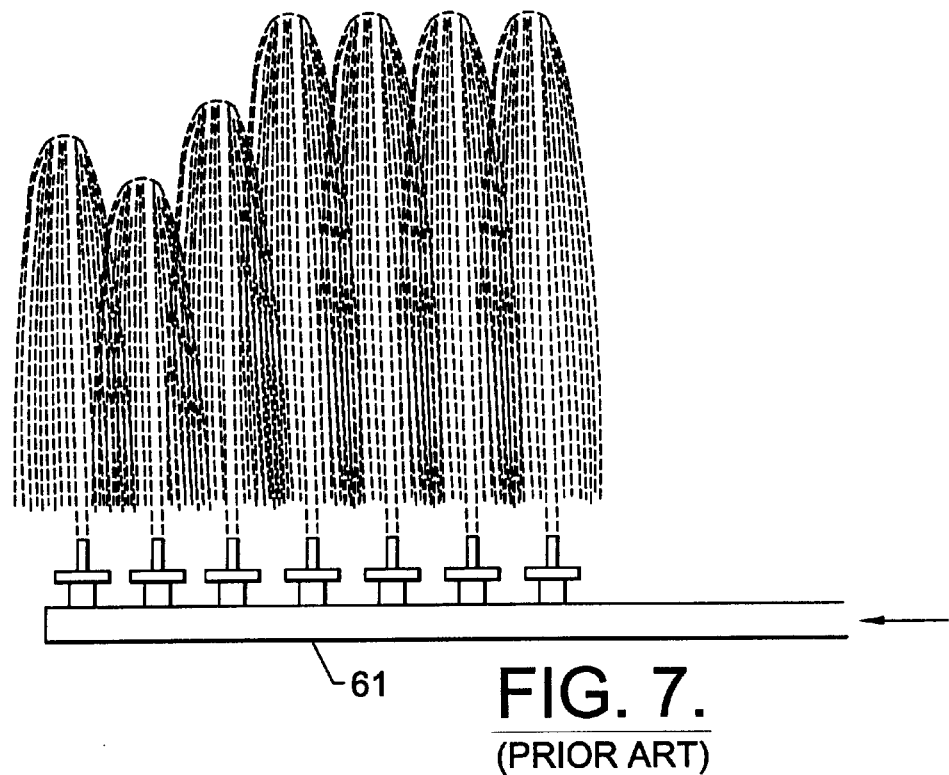
FIG. 7 is a view showing the result (blow-up state of each nozzle) of experiment using a spray pipe which is a comparative example of the present invention.

The result was that the blow-up state of three nozzles on the closed end side was unstable, and the average blow-up height was lower than that of the other nozzles. In particular, as the overall blow-up height was higher, this phenomenon was more remarkable. For example, as shown in FIG. 7, the blow-up heights of the three nozzles on the closed end side were extremely low, the blow-up state thereof being unstable. FIG. 7 was drawn based on the photograph taken during the experiment.

The principle of the occurrence of such a phenomenon is thought to be as follows: When the flow passage of spray pipe has a constant cross section as shown in FIG. 10, and the end plate 61a is disposed on the outside far distant from the nozzle inlet, the liquid is repelled by the end plate 61a and a flow in the reverse direction is produced, resulting in the generation of whirlpool. The generated whirlpool repeats unstable forward and counter rotation. For this reason, the flow of liquid into the nozzles in the vicinity of the closed end is nonuniform, and the height of liquid column varies greatly. By such flow turbulence, the average static pressure near the nozzle inlet in the vicinity of the closed end is decreased, and the average blow-up height becomes extremely low as compared with the other nozzles.

(b) Experiment 2

In Experiment 2, a spray pipe, which is provided with a tilting plate of the same construction (construction shown in FIG. 3) as that of the spray pipe 22, 23 in the above embodiment and has four different end plate inner face positions L as given in Table 1, was used, the overall blow-up heights were changed from 3 m to 9 m, and the blow-up state of each nozzle was confirmed by visual observation and photography etc. In this case as well, as in Experiment 1, a 200A pipe (D=204.6 mm) was used, d being 40 mm, and R being 40 mm.

Figure 9:
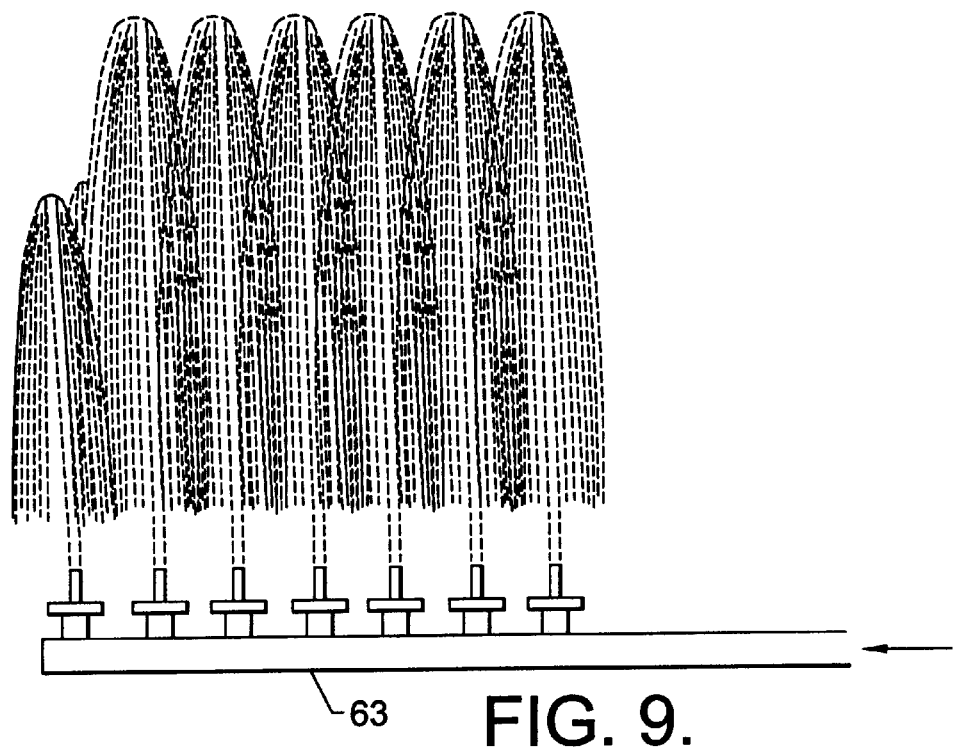
FIG. 9 is a view showing the result (blow-up state of each nozzle) of experiment using a spray pipe in accordance with the embodiment of the present invention.

The result was that as given in Table 1, for a spray pipe 63 of $L=L_0+20$ mm, the blow-up state of the tip end nozzle (nozzle closest to the closed end) was disturbed, and the blow-up height was extremely low and unstable as shown in FIG. 9. FIG. 9 shows the photography result in the case where the overall blow-up heights are about 7 m.

TABLE 1

| Run No. | End plate position | Blow-up state | Comprehensive evaluation |
|---------|-------------------|---------------|--------------------------|
| 1 | $L = L_0 + 20$ | Poor blow-up of tip end nozzle | × |
| 2 | $L = L_0 + 10$ | Slightly unstable blow-up of tip end nozzle | ○ |
| 3 | $L = L_0 \pm 0$ | Slightly unstable blow-up of tip end nozzle | ◎ |
| 4 | $L = L_0 - 10$ | Good | ◎ |

A spray pipe 60 of $L=L_0-10$ mm was best, in which the blow-up state of the tip end nozzle is most stable, the blow-up heights were uniform and stable as a whole as shown in FIG. 6. FIG. 6 shows the photography result in the case where the overall blow-up heights are about 7 m.

Figure 8:
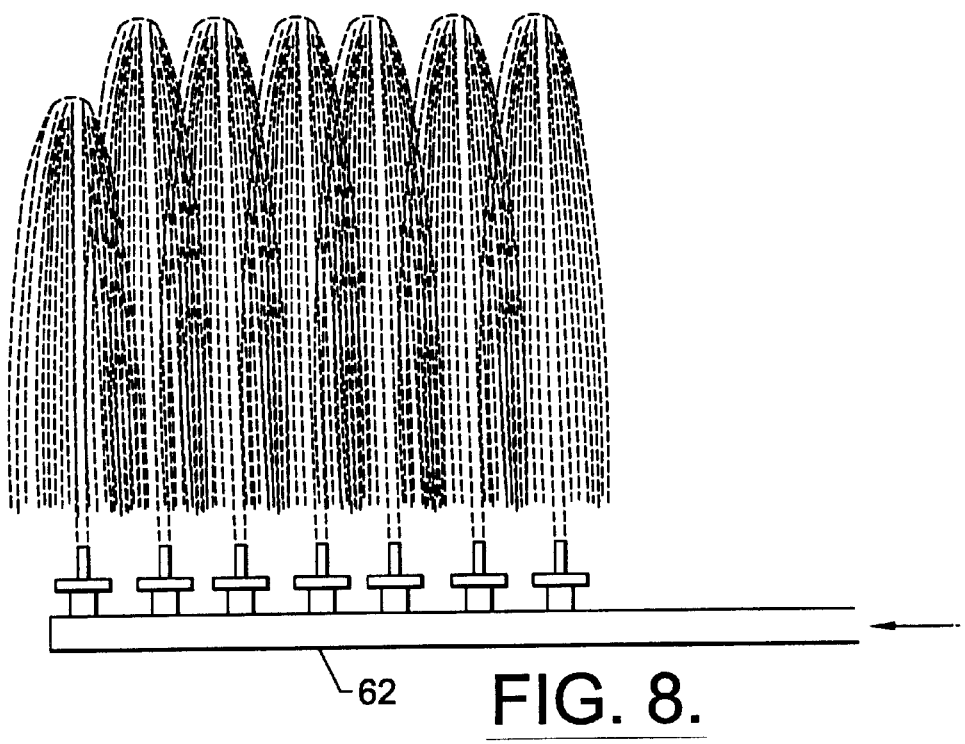
FIG. 8 is a view showing the result (blow-up state of each nozzle) of experiment using a spray pipe in accordance with the embodiment of the present invention.

Even for a spray pipe 62 of $L=L_0+10$ mm and a spray pipe of $L=L_0\pm0$ mm, although the blow-up state of the tip end nozzle was slightly unstable, the state was markedly better than that of the spray pipe of $L=L_0+20$ mm. FIG. 8 shows the photography result in the case where the overall blow-up heights are about 7 m.

The principle of blow-up state being good is thought to be as follows: When the flow passage of spray pipe is of a tapered shape as shown in FIG. 3, and the end plate 51 is disposed on the inside from the maximum inlet internal diameter of nozzle, as indicated by the arrows in FIG. 3, the flow repelled by the end plate 51 and going in the counter direction is not produced, so that the liquid flows into the inlet of each nozzle stably in a well-regulated manner. Therefore, the disturbance of blow-up state and the variation in height do not occur, and the flow velocity is made uniform. Thereby, the static pressure affecting the blow-up height is also made uniform, so that the blow-up heights for other nozzles (nozzles distant from the closed end) are made uniform.

(c) Experiment 3

Figure 11:
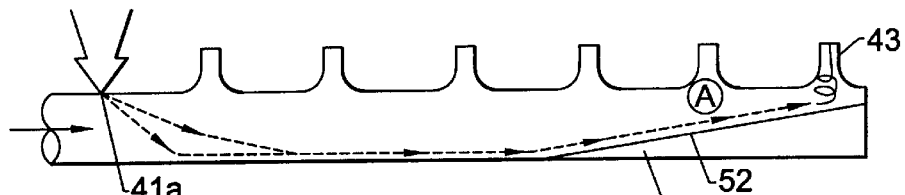
FIG. 11 is a schematic view for illustrating the outline of equipment used in Experiment 3.

FIG. 11 shows testing equipment. This equipment is a transparent acrylic model simulating the end portion of the spray pipe for an actual apparatus, in which six liquid column nozzles 43 (nozzle density $N=4/m^2$) with a discharge port diameter of 40 mm are arranged at intervals of 500 mm, a tilting plate 52 is installed at the closed end portion of the spray pipe 41, and an input port 41a for heaps of scales is provided at the inlet end portion of the spray pipe 41. The liquid discharged from the liquid column nozzles is returned to a tank and reused by circulation.

Test Method

Test Procedure

Tests were performed by the following procedure by assuming two cases of normal operation and restart after short-term operation stoppage.

(1) In the test for normal operation, fresh water was used as a circulating liquid so that the behavior of heaps of scales can be observed with ease. After a predetermined quantity of circulating liquid is supplied to the spray pipe 41, a dozen or so heaps of scales with a substantially uniform size were inputted from the inlet end of the spray pipe 41, and the behavior of the heaps of scales in the spray pipe 41 and the discharge state thereof from the liquid column nozzle were investigated.

(2) In the test for restart, after a liquid with a slurry concentration of 20 wt % was circulated with a circulating liquid quantity $L'=200$ $m^3/m^2$ h, heaps of scales of 10 to 25 mm were inputted from the inlet end of the spray pipe 41. Immediately after that, the circulating pump was stopped. After waiting for slurry to settle in the spray pipe 41, the liquid in the slurry pipe 41 was removed, a short-term operation stopping state was created, and the slurry was allowed to stand. During the time when the slurry was allowed to stand, the slurry liquid in the tank was replaced with fresh water so that the behavior of heaps of scales could be observed with ease, and the restart test was performed one week after the inputting of heaps of scales.

Test Results

Discharge of Heaps of Scales in Normal Operation

The discharge (accumulation) state of heaps of scales inputted from the inlet end of spray pipe was observed visually by circulating water.

Behavior of Heaps of Scales in Spray Pipe (1) The heaps of scales inputted from the inlet end of spray pipe are carried by the circulating liquid flow, and made to flow to the downstream side while settling. When they reach the spray pipe bottom, they move on the spray pipe bottom so as to creep. Although they are liable to be stagnant near the junction with the tilting plate, they move along the tilting plate and reach a position under the end nozzle.

Figure 12:
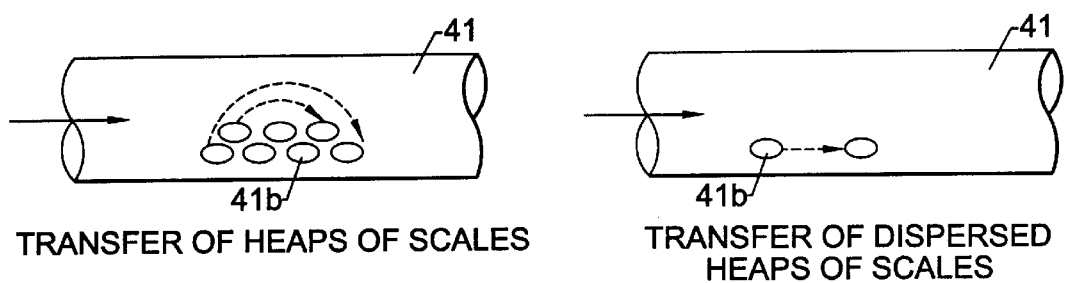
FIG. 12 is a schematic view for illustrating the transfer of heaps of scales in the spray pipe.

(2) A whirlpool is produced on the downstream side of the heaps of scales on the spray pipe bottom and the tilting plate. If a plural number of heaps of scales 41b pile up into a mountain shape as shown in FIG. 12, the heaps of scales 41b on the upstream side get over the mountain successively and are positioned on the downstream side; thus, the dispersed heaps of scales move slidingly.

Figure 13:
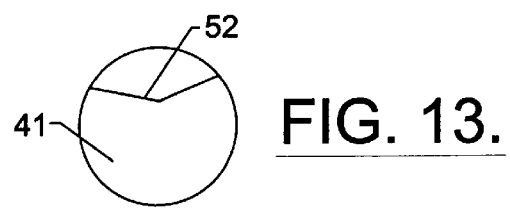
FIG. 13 is a sectional view for illustrating an embodiment in which the tilting plate 52 consists of a concave tilting plate.

(3) Of the heaps of scales on the tilting plate after passing through a position under the nozzle before the end nozzle, the heaps of scales at both sides of the tilting plate 52 moves slowly, being apt to stay. Therefore, the tilting plate 52 should preferably be in a concave form as shown in FIG. 13.

Discharge of Heaps of Scales From Liquid Column Nozzle (1) All of the heaps of scales in the range of 3 to 35 mm used in this test were discharged from the end nozzle (discharge port diameter of 40 mm) on the downstream side, and the discharge of heaps of scales from the upstream nozzles other than the end nozzle was not observed.

(2) When the heaps of scales are discharged from the end nozzle, the heaps of scales reaching a position on the tilting plate 52 under the end nozzle are raised by a weak whirlpool of circulating liquid going toward the nozzle and discharged. The heaps of scales larger than about 20 mm are discharged in such a manner as to wait the generation of a suitable whirlpool, and even a plural number of them are discharged successively. To discharge the heaps of scales, the circulating liquid quantity should be 200 $m^3/m^2$ h or more, preferably 240 $m^3/m^2$ h or more.

INDUSTRIAL APPLICABILITY

According to the present invention, in the absorption tower of the exhaust gas desulfurization system, the blow-up state from the spray pipes is uniform and stable, so that a high desulfurization percentage can be obtained. Moreover, the present invention achieves a reduction in operation cost. Therefore, the industrial applicability of the present invention is high.

What is claimed is:

1. An exhaust gas desulfurization system for absorbing sulfur oxides in exhaust gas by bringing absorbent slurry into contact with the exhaust gas, in which a plurality of spray pipes each of which are provided with a plurality of nozzles arranged in the lengthwise direction and whose one end is closed are arranged horizontally at the lower part of a contact treatment tower as a means for bringing the absorbent slurry into contact with the exhaust gas, so that the absorbent slurry containing slurry heaps is fed from the other end of said spray pipe and brought into contact with the exhaust gas by injecting the absorbent slurry and slurry heaps upward from said nozzles to perform absorption treatment, said exhaust gas desulfurization system being characterized in that said spray pipe is formed of a pipe with a constant cross section, a tilting plate which tilts to the nozzle side toward the closed one end of said pipe is installed inside the pipe on the closed one end side, said tilting plate is connected to an end plate for closing one end of said spray pipe in a proper positional relation, the inner face position of said end plate is set at a position between a position of the maximum inlet inside diameter of nozzle positioned on the most downstream side of said spray pipe and a position 0.05 D distant from the aforesaid position to the downstream side, and said tilting plate is arranged from a middle position between the third and fourth nozzles from the most downstream nozzle or from a middle position between the fourth and fifth nozzles and tilted so that the area above said tilting plate at the position of the most downstream nozzle is 0.2 to 0.3 times the cross-sectional area of spray pipe.

2. An exhaust gas desulfurization system for absorbing sulfur oxides in exhaust gas by bringing absorbent slurry into contact with the exhaust gas, characterized in that a spray pipe which is provided with a plurality of nozzles in the lengthwise direction and whose one end is closed is arranged horizontally in an absorption tower through which the exhaust gas passes vertically, the absorbent slurry is fed from the other end of said spray pipe and injected upward from said nozzles, by which the absorbent slurry is brought into contact with the exhaust gas to perform treatment, and a flow passage on the closed one end of said spray pipe is formed in a shape such that the flow passage cross-sectional area decreases toward the closed one end, wherein the inner face position of an end plate for closing one end of said spray pipe is set at a nearby position 0.05 D, wherein D is the inside diameter of said spray pipe, distant from the position of the maximum inlet inside diameter of nozzle positioned closest to the closed one end of said spray pipe toward the closed one end side, or at a position on the inside of said nearby position.

* * * * *